(12) United States Patent
Wassell et al.

(10) Patent No.: US 8,397,562 B2
(45) Date of Patent: Mar. 19, 2013

(54) APPARATUS FOR MEASURING BENDING ON A DRILL BIT OPERATING IN A WELL

(75) Inventors: Mark Ellsworth Wassell, Houston, TX (US); Martin E. Cobern, Cheshire, CT (US); Carl Allison Perry, Middletown, CT (US)

(73) Assignee: APS Technology, Inc., Wallingford, CT (US)

( * ) Notice: Subject to any disclaimer, the term of this patent is extended or adjusted under 35 U.S.C. 154(b) by 591 days.

(21) Appl. No.: 12/512,740

(22) Filed: Jul. 30, 2009

(65) Prior Publication Data

US 2011/0024188 A1 Feb. 3, 2011

(51) Int. Cl.
*E21B 44/00* (2006.01)

(52) U.S. Cl. .................................................. 73/152.48

(58) Field of Classification Search ............... 73/152.48, 73/152.49

See application file for complete search history.

(56) References Cited

U.S. PATENT DOCUMENTS

| | | | |
|---|---|---|---|
| 3,255,627 A * | 6/1966 | Doig et al. | 73/152.46 |
| 3,466,597 A * | 9/1969 | Richter, Jr. et al. | 340/853.9 |
| 3,686,942 A * | 8/1972 | Chatard et al. | 73/152.48 |
| 3,968,473 A | 7/1976 | Patton et al. | |
| 4,303,994 A | 12/1981 | Tanguy | |
| 4,324,297 A | 4/1982 | Denison | |
| 4,359,898 A | 11/1982 | Tanguy et al. | |
| 4,445,578 A | 5/1984 | Millheim | |
| 4,479,564 A | 10/1984 | Tanguy | |
| 4,507,735 A * | 3/1985 | Moorehead et al. | 702/9 |
| 4,608,861 A * | 9/1986 | Wachtler et al. | 73/152.48 |
| 4,662,458 A | 5/1987 | Ho | |
| 4,709,726 A | 12/1987 | Fitzgibbons et al. | |
| 4,715,451 A | 12/1987 | Bseisu et al. | |
| 4,739,841 A | 4/1988 | Das | |
| 4,760,735 A | 8/1988 | Sheppard et al. | |
| 4,802,143 A | 1/1989 | Smith | |

(Continued)

OTHER PUBLICATIONS

Response to Written Opinion under Article 34 submitted May 27, 2011 in PCT/US2010/043985 APS Technology, Inc.

(Continued)

*Primary Examiner* — John Fitzgerald
(74) *Attorney, Agent, or Firm* — Woodcock Washburn LLP

(57) ABSTRACT

An apparatus for measuring the bending on a drill bit operating down hole in a well may comprise at least three pockets circumferentially spaced equidistantly around the drill collar of the drill string to which the drill bit is attached. Four strain gauges are equidistantly circumferentially spaced around each of the pockets so as to form first and second sets of strain gauges. The strain gauges in the first set are connected into one Wheatstone bridge while the gauges in the second set are connected in a second bridge. Each of the strain gauges that are oriented similarly within each of the pockets are connected in series within a single leg of a bridge so that the output voltage of the bridge is unaffected by bending in the drill string. The output of first bridge is used to determine the bending on the drill bit. Further, an apparatus for measuring the bending, weight, and torque on a drill bit operating down hole in a well may comprise at least three pockets circumferentially spaced equidistantly around the drill collar of the drill string to which the drill bit is attached with twelve strain gauges that are equidistantly circumferentially spaced around each of the pockets so as to form first and second sets of strain gauges. The arrangement of the twelve strain gauges allow for a bending on bit measurement that cancels out the affects of the weight on bit and torque on bit.

1 Claim, 10 Drawing Sheets

U.S. PATENT DOCUMENTS

| | | | |
|---|---|---|---|
| 4,821,563 A | | 4/1989 | Maron |
| 4,958,125 A | | 9/1990 | Jardine et al. |
| 4,958,517 A | | 9/1990 | Maron |
| 5,193,628 A | * | 3/1993 | Hill et al. .................... 175/45 |
| 5,251,708 A | | 10/1993 | Perry et al. |
| 5,363,095 A | * | 11/1994 | Normann et al. .......... 340/854.7 |
| 5,386,724 A | | 2/1995 | Das et al. |
| 5,813,480 A | * | 9/1998 | Zaleski, Jr. et al. ............. 175/40 |
| 6,068,394 A | | 5/2000 | Dublin |
| 6,216,533 B1 | | 4/2001 | Woloson et al. |
| 6,547,016 B2 | | 4/2003 | Wassell |
| 6,802,215 B1 | * | 10/2004 | Boucher et al. ............ 73/152.48 |
| 7,999,695 B2 | * | 8/2011 | Rodney et al. ............. 340/855.5 |
| 8,087,477 B2 | * | 1/2012 | Sullivan et al. ................. 175/40 |
| 2002/0070050 A1 | * | 6/2002 | Wassell ............................ 175/39 |
| 2005/0109097 A1 | * | 5/2005 | Bogath et al. .............. 73/152.49 |

OTHER PUBLICATIONS

International Search Report and Written Opinion dated Sep. 22, 2010 PCT/US2010/043985 APS Technology, Inc.

In the United States Patent and Trademark Office, In Re: U.S. Appl. No. 09/734,983, Non-final Office Action dated Apr. 9, 2002.

\* cited by examiner

Axial Direction

APPARATUS FOR MEASURING BENDING ON A DRILL BIT OPERATING IN A WELL

FIELD

The current invention is directed to an apparatus for measuring bending on a drill bit. More specifically, the current invention is directed to the measurement of the bending on a drill bit operating down hole in a well, such as an oil well.

BACKGROUND

In underground drilling, such as gas, oil, or geothermal drilling, a bore is drilled through a formation deep in the earth. Such bores are formed by connecting a drill bit to sections of pipe, referred to as "drill pipe," so as to form an assembly commonly referred to as a "drill string" that is suspended from a rig at the surface and that extends down to the bottom of the bore. The drill bit is rotated so that it advances into the earth, thereby forming the bore. In rotary drilling, the drill bit is rotated by rotating the drill string at the surface. In directional drilling, the drill bit is rotated by a down hole mud motor coupled to the drill bit; the remainder of the drill string is not rotated during drilling. In a steerable drill string, the mud motor is bent at a slight angle to the centerline of the drill bit so as to create a side force that directs the path of the drill bit away from a straight line. In any event, in order to lubricate the drill bit and flush cuttings from its path, piston operated pumps on the surface pump a high pressure fluid, referred to as "drilling mud," through an internal passage in the drill string and out through the drill bit. The drilling mud then flows to the surface through the annular passage formed between the drill string and the surface of the bore.

Depending on the drilling operation, the pressure of the drilling mud flowing through the drill string will typically be between 0 and 25,000 psi. In addition, there is a large pressure drop at the drill bit so that the pressure of the drilling mud flowing outside the drill string is considerably less than that flowing inside the drill string. Thus, the components within the drill string are subject to large pressure forces. In addition, the components of the drill string are also subjected to wear and abrasion from drilling mud, as well as the vibration of the drill string.

Throughout the drilling operation, a drill bit may be subject to various loads that act on the drill string. The fundamental loads acting on the drill string are: axial tension, torsion, bending, pressure and temperature. All of these loads result in strain being applied to the drill string. These loads may be static or dynamic and fluctuate during the drilling process. The axial tension loads are due to applying a drilling weight to the drill bit. This is normally referred to "weight-on-bit" or WOB. The actual amount of weight-on-bit depends on the entire weight of the drillstring and the amount tensile load applied at the rig. This is typically referred to as "hook load". Secondary loads that effect the weight applied to the bit are hydrostatic loads and friction loads. The hydrostatic loads depend on the depth at the bit and the density of the drilling fluid. There are also friction loads along the length of the drillstring due to contact between the drillstring and the borehole. Torsion loads are applied to the drill string to provide adequate cutting torque at the bit. Bit torque may is applied by two means; by a motor at the rig that rotates the drill string that in turn rotates the bit, and/or by a down hole motor that rotates the a drive shaft just above the bit. Drill string bending comes from the well path curvature, sagging of the drill string due to gravitational forces and buckling. Typically, as the well is drill deeper the temperature increases. However, there may be temperature variations within different formations. The annulus temperature and the temperature within the fluid within the bore of the drill string may be slightly different. Bore temperatures tend to be slightly cooler than the annulus temperatures.

The loads applied to the drill string strain the drill string material. Strain gauges can be used to measure these loads. The strain gauges are positioned on a drill collar such that the are subjected to certain strains. The gauges are connected in a bridge arrangement such that the measure the desired load while eliminating the effects of other loads. For example, the gauges can be mounted on a drill collar and connected to one another such that the bridge measures only the bending load, subtracting out tensile and torque loads. Pressure and temperature stains can not be cancelled out. Therefore, these loads and measured and a correction factor is applied to the measurement. The measurements may be recorded down hole and/or transmitted to the surface by mud pulse or wired pipe.

U.S. Pat. No. 6,547,016, entitled "Apparatus for Measuring Weight and Torque on a Drill Bit Operating in a Well," hereby incorporated by reference in its entirety, provides methods for calculating weight on bit and torque on bit in such a way that the effects of bending do not effect the calculations, but does not include any manner for measuring the effects of bending.

SUMMARY

Methods of measuring bending loads are lacking in conventional weight on bit and torque on bit measurement systems. Disclosed herein are methods and an apparatus for measuring the bending on a drill bit. The benefits of incorporating strain gauges that measure bending loads in the manner disclosed have not been realized. Such apparatus comprises first, second, and third pockets formed in a drill pipe, where the pockets are circumferentially spaced approximately equidistantly around the pipe. Each of the pockets forms at least one wall, and a set of strain sensors is affixed to the wall in each pocket. Circuitry connects each of the strain sensors in each set, forming a bridge with a first, second, third, and fourth legs. The bridge is arranged in a manner to enable the apparatus to sense the bending of a drill bit.

Further, an apparatus may comprise a similar arrangement of sensors that can measure weight and/or torque applied to a drill bit. In such an apparatus, a set of sensors for each measurement type may be arranged and connected via circuitry to form a bridge. The bridge may be arranged to enable each set of sensors to separately measure the bending, weight, and torque on a drill bit.

DETAILED DESCRIPTION

Disclosed herein are techniques for measuring bending on bit (BOB). A bending load is the bending of the longitudinal axis of the drill string. Information concerning the bending on the drill bit can provide useful information for the drilling operator. For example, a drill pipe subjected to a bending strain as it rotates experiences a cyclically varying bending stress, which can lead to a deviation of the drill bit from its intended course. Thus, information concerning the bending on the drill bit can alert an operator to take appropriate corrective action to return the drill bit to its intended path. A sufficiently large bending load can cause fatigue-damage on each revolution. If known, the operator can take corrective measures to decrease the amount of bending, which may include replacing deformed sections of the drill string. In this manner, information concerning the bending on bit can assure that the target formation is drilled within tolerance limits, helping to avoid wasted drilling time. Further, the operator can use bending on bit information for better directional control of the drill string.

Figure 1:
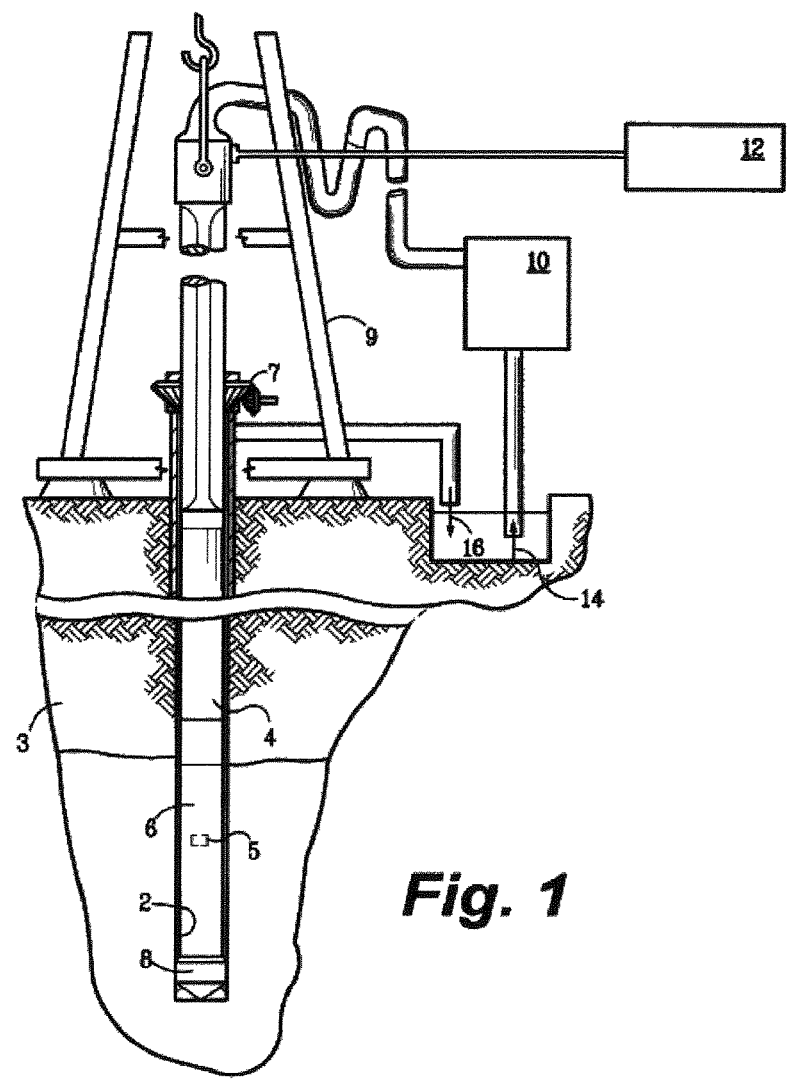
FIG. 1 is a view, partially schematic, of a drilling rig in which the drill string incorporates an apparatus for measuring bending on the drill bit according to the present invention.

A drilling system that can employ the disclosed techniques of measuring bending on bit is shown in FIG. 1. The system comprises a derrick 9 that supports a drill string 4. A drill bit 8 is coupled to the distal end of a drill collar section 6 of the drill string 4. A drill bit may be any suitable drill bit using in a drilling operation, including conventional drill bits, coring bits, and reamers. The drill bit 8 forms a bore 2 in the earthen formation 3. The weight on the drill bit 8 is controlled by varying the hook load on the derrick 9. A prime mover (not shown) drives gearing 7 that rotates the drill string 4 so as to control the torque on the drill bit 8.

Figure 3:
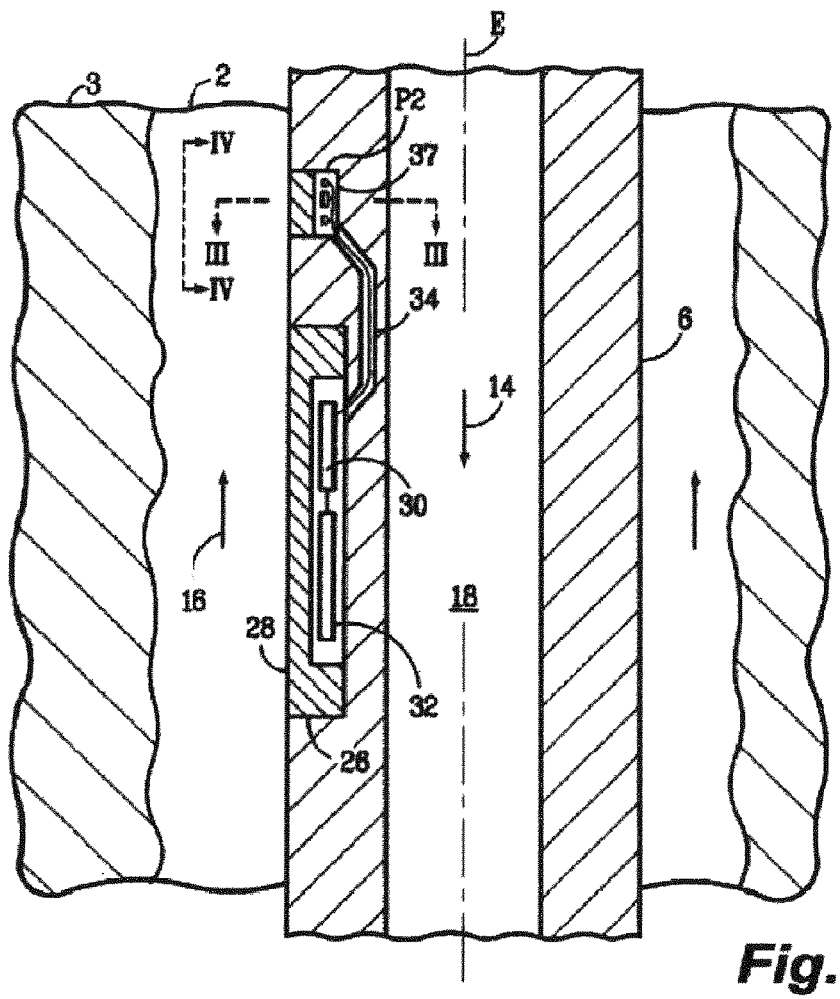
FIG. 3 is a longitudinal cross-section through the drill collar portion of the drill string shown in FIG. 1.

As is conventional, a pump 10 pumps drilling mud 14 downward through an internal passage 18, shown in FIG. 3, in the drill string 4. After exiting at the drill bit 8, the returning drilling mud 16 flows upward to the surface through an annular passage formed between the drill string 4 and the bore 2. As is also conventional, a data acquisition system 12 at the surface senses pressure pulsations in the drilling mud 14 created by a mud pulser 5 that contain encoded information concerning the drilling operation. A bending moment may be imposed on the drill bit by the reaction forces on the bit and the submerged weight of the drill string in the drilling fluid (eg., mud). The angle in direction of the drill string can cause bending, particular at the joint in the bore hole where the direction changes. The more weight on in the drill string (e.g., the number of interconnected pipes suspended from the top drive assembly) may result in more stress at that joint.

Figure 2:
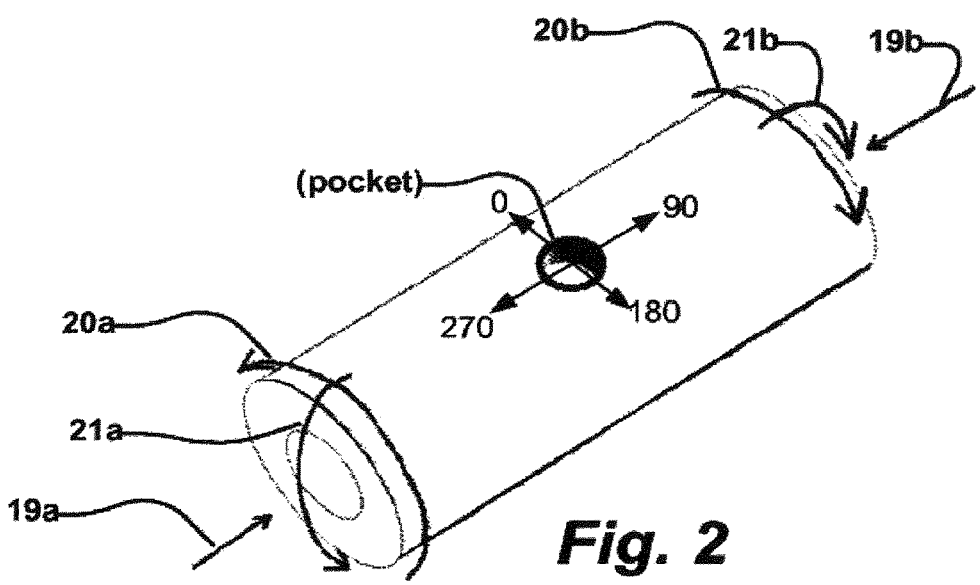
FIG. 2 is a view of a portion of a drill collar.

FIG. 2 shows three of the primary loads of interest acting on the drill string. The tensile load is a force, or forces, 19a, 19b, that attempt to stretch or compress the drill string along the longitudinal axial of the drill collar. The torsion load, 20a, 20b, attempts to twist the drill string about the longitudinal axis. The bending load, 21a, 21b, is bending of the longitudinal axis. The bending load on the drill string may result from the curvature of the hole through which the drill string is boring. For example, if the desired bore-hole to form in a foundation is not directly downward into the earth, but rather changes direction or is to be bored at an angle (as shown in FIG. 1), the drill string bends to accommodate the directional changes. The weight on bit can cause buckling or bending stress at various points along the drill string. The amount of "weight on bit" may vary by adjusting the weight applied to the drill bit when suspending, from a top drive assembly, a succession of drill collars and drill pipes that are screwed together to form the drill string. When rotating the drill string, the bending stress may change, which may modify the tensile stress values. As described in more detail below, strain gauges may be mounted in a circular pocket 17 in the drill collar 6 in suitable positions to measure the tensile, torsion, and bending loads acting on the drill string.

Figure 4:
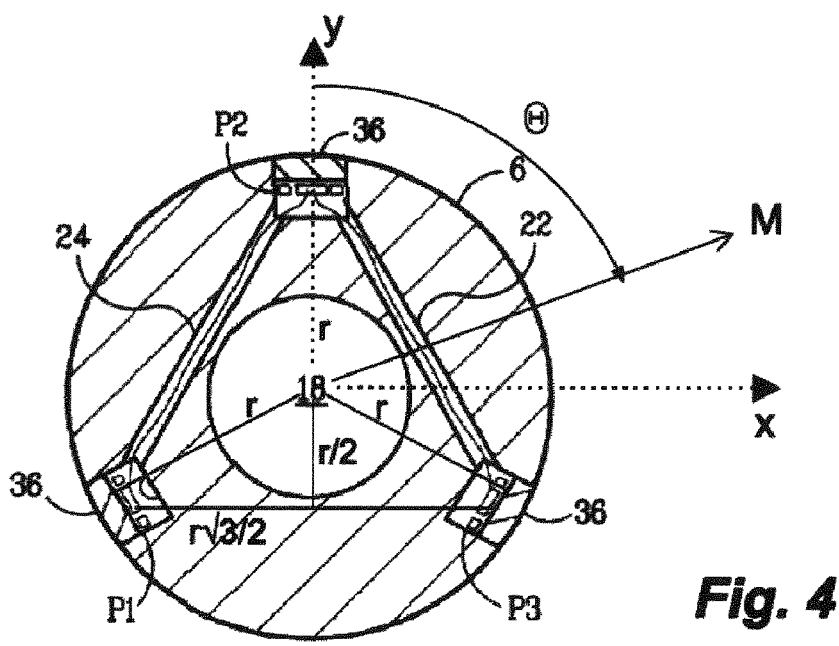
FIG. 4 is a transverse cross-section taken along line III-III in FIG. 3.

The drill collar 6 is shown in detail in FIGS. 3 and 4. As is conventional, the drill collar 6 is formed from a section of drill pipe having threaded connections at each end (not shown) that allow it to be coupled into the drill string. For example, one end of the drill collar is coupled to the drill bit 8 from FIG. 1 while the other end is coupled to an uphole section of the drill string. According to the disclosed techniques, three pockets 37, identified as P1, P2 and P2 in FIG. 4, are circumferentially spaced equidistantly around the circumference of the drill collar 6. One example pocket, P2, is visible in FIG. 3 because FIG. 3 depicts a cross-section view of the drill collar portion of the drill string. Preferably, the pockets, P1, P2, and P3 are located on a common plane oriented perpendicularly to the centerline E of the drill collar 6. Each pocket, P1, P2, P3, extends radially inward from the surface of the drill collar 6 toward the centerline E so as to form a cylindrical side wall 38 and a bottom wall 35 (see FIG. 5B). Each pocket 37 is closed by a cap 36, which is secured to the drill collar 6 via a snap ring (not shown) and incorporates O-rings (not shown) that seal the pocket from the drilling mud 16.

Figure 5A:
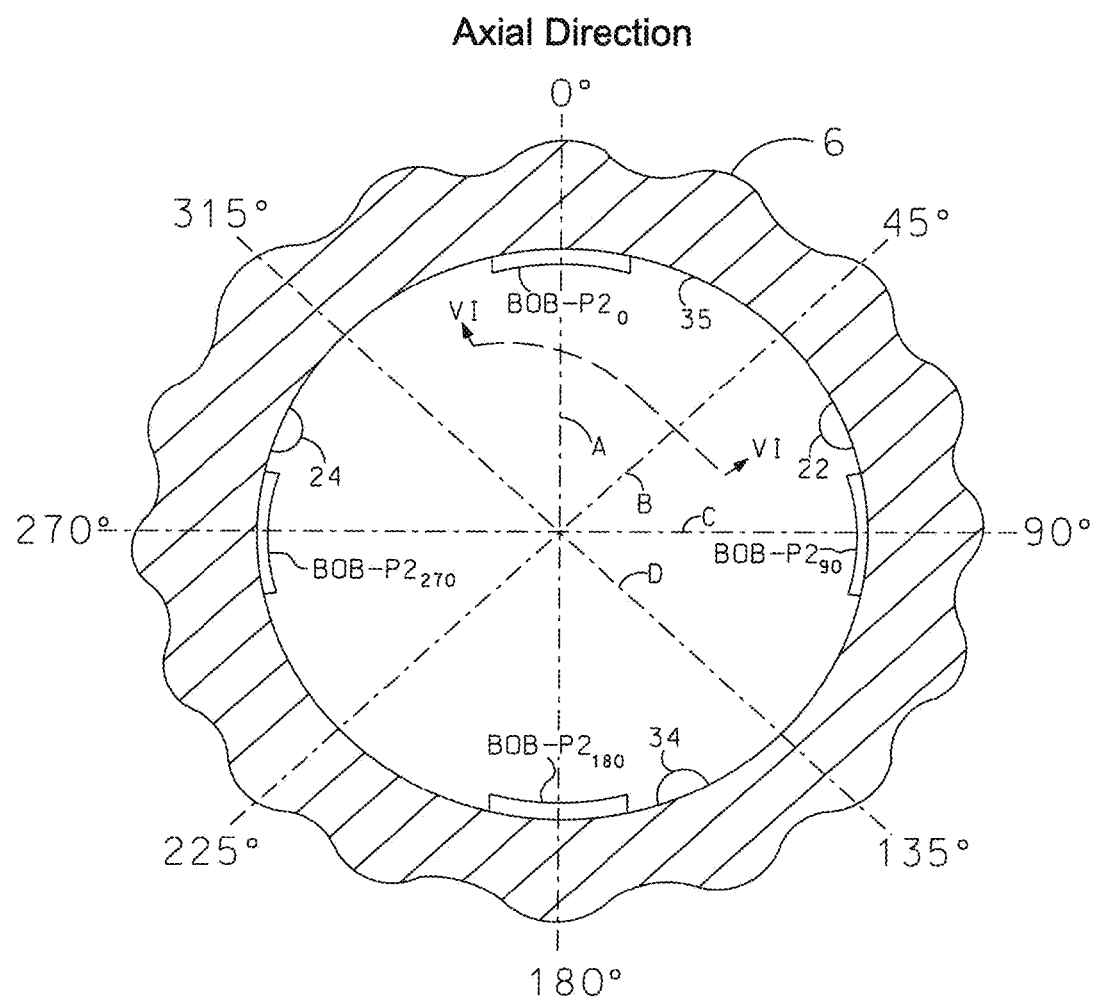
FIG. 5A is an elevation view taken along line IV-IV in FIG. 3 looking into the pocket, with the plug removed, showing the orientation of the bending on bit strain gauges.
Figure 5B:
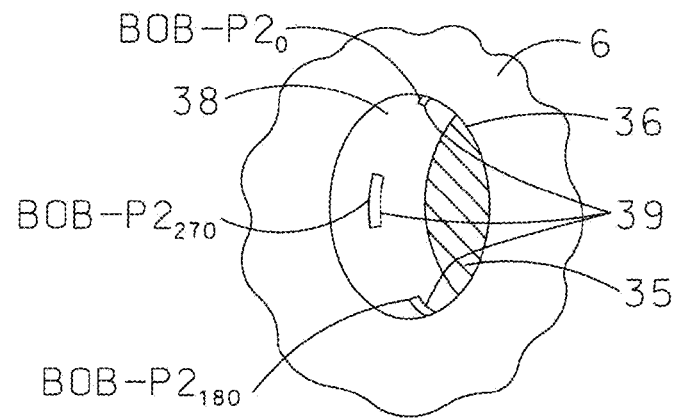
FIG. 5B is an isometric view of the pocket shown in FIG. 5A.

As shown in FIG. 5A and 5B, a first transversely extending passage 24 connects pockets P1 and P2, and a second transversely extending passage 22 connects pockets P2 and P3. As shown in FIG. 5A, an axially extending passage 34 connects pocket P2 to a recess 26 formed in the drill collar 6. A circuit board 30 and microprocessor 32 are housed within the recess 26, which is sealed with a cap 36. The passages 22, 24 and 34 permit electrical conductors to extend between the pockets P1, P2 and P3 and between the pocket P2 and the recess 26 so as to complete the circuitry described in detail below.

The drill bit located at the distal end of the drill string can be rotated by rotating the drill string at the surface. Thus, the drill collar 6 and pockets P1, P2, P3 may rotate. If the drill string and drill collar are rotating, the axial tension or compression will vary with time. On the inside of the bend, the gauges will be in compression and on the outside in tension. The measured bending will vary, approximately sinusoidally, as the pockets P1, P2, P3 rotate. The bending moment will be equal to one-half of the difference between the maximum and minimum readings over a time that covers several rotation periods, i.e., $$BOB = \frac{(M_{max} - M_{min})}{2}$$

The results for all of the pockets are averaged for best results. This method of measurement can eliminate the contributions to the bending measurement that result from the weight on the drill bit or pressure, as the WOB and pressure measurements will be equal for all pockets and not dependent upon the drill collar's orientation. The rotating method can be used with one or more WOB bridges. To determine whether or not the drill string or drill collar is rotating, in the absence of a rotation sensor, a limit on the variation of the individual readings can be used. For example, the following can define a non-rotating (or non-bending) condition:

$$\frac{M_{max} - M_{min}}{M_{max} + M_{min}} < L$$

where
M is the WOB measurement of a given bridge
L is a limit (e.g., 1-3%).

If all three bridges produce results that meet this criterion, then it may be assumed that the drill collar is rotating and the method can be used. As shown in FIGS. 5A and 5B, conventional strain gauges 39, such as foil or semiconductor type gauges, are affixed to the side wall 38 of each of the pockets BOB P1, P2 and P3. The details of the arrangement of the bending on bit (BOB) strain gauges 39 are shown in FIG. 4 for pocket P2 but it should be understood that the BOB strain gauges are arranged identically in each of the pockets. As shown in FIG. 5A, four bending on bit (BOB) strain gauges 39 are equidistantly spaced around the circumference of the pocket side wall 38. With reference to the angle of orientation shown for each of the strain gauges, the four BOB gauges 39 are shown spaced around the circumference of the pocket side wall 38 at angles 0, 90, 180, and 270 orientation (i.e., BOB-P$2_0$, BOB-P$2_{90}$, BOB-P$2_{180}$ and BOB-P$2_{270}$).

As shown in FIG. 5B, the BOB gauges are positioned longitudinally in the drill collar on the same plane. The strain gauges in each pocket P are electrically connected so as to form three sets of strain gauges (i.e., a set in each of the three pockets) each set comprised of four gauges (i.e., 4 gauges in each pocket). The strain gauges 39 in the first set of strain gauges in pocket P2 are identified as BOB-P$2_0$, BOB-P$2_{90}$, BOB-P$2_{180}$, and BOB-P$2_{270}$ and, together with similarly oriented strain gauges in the other two pockets, are used to determine the bending on the drill bit 8. Strain gauges BOB-P$2_0$ and BOB-P$2_{180}$ are disposed on opposite sides of the pocket side wall 38 and are located along a line A that is parallel with the center line E of the drill collar 6 so that BOB-P$2_0$ is located at the 0° circumferential orientation and BOB-P$2_{180}$ is located at the 180° orientation, with 0° being top dead center of the pocket P2. Strain gauges BOB-P$2_{90}$ and BOB-P$2_{270}$ are also disposed on opposite sides of the pocket side wall 38 and located along a line C that is perpendicular to line A, and therefore to the center line E of the drill collar 6, so that BOB-P$2_{90}$ is located at the 90° circumferential orientation and BOB-P$2_{270}$ is located at the 270° orientation.

Figure 6:
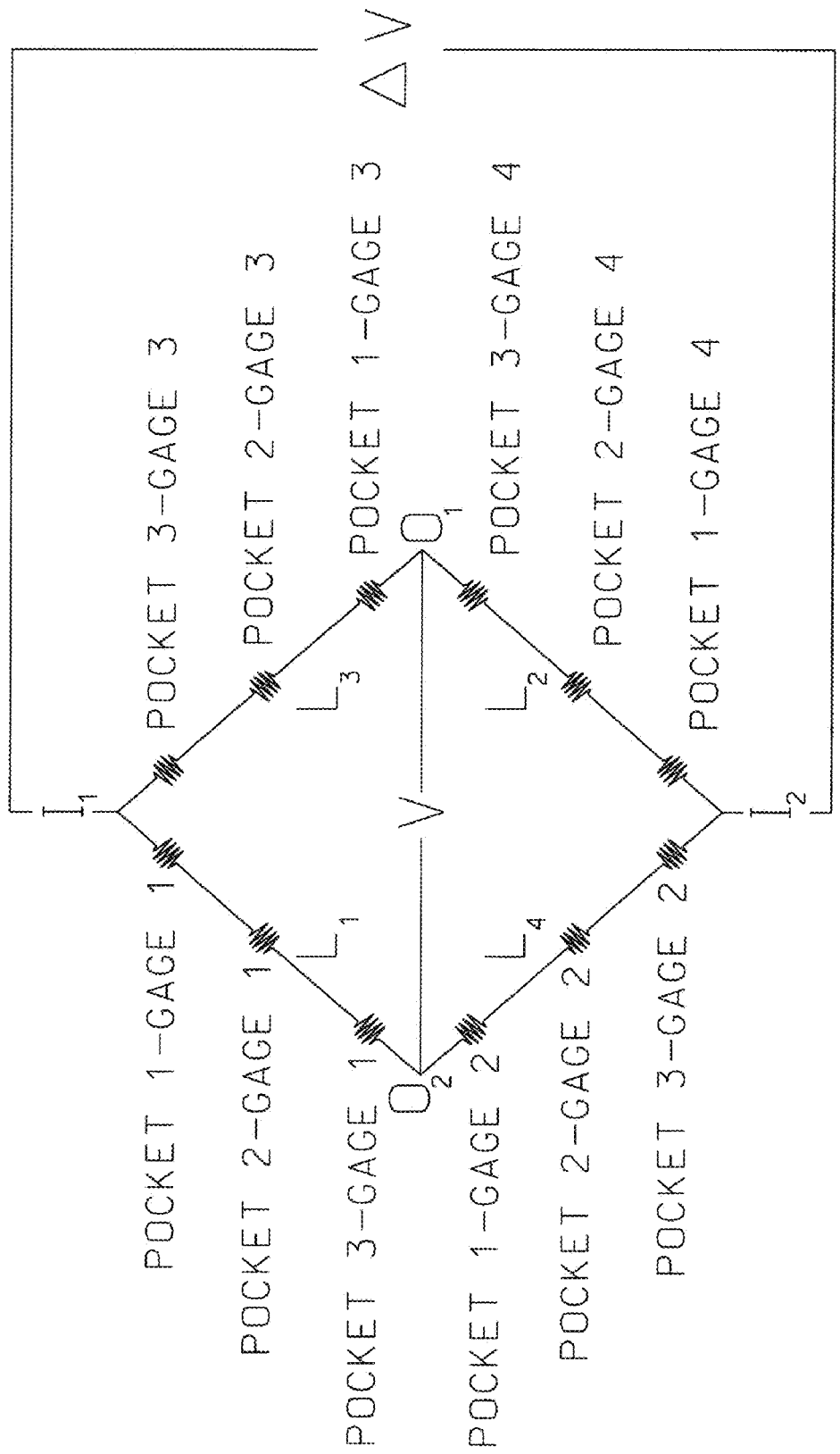
FIG. 6 is schematic diagram of the system for measuring the bending on the drill bit according to the current invention.

As shown in FIG. 6, the BOB measurement utilizes four gauges in each of the three collar pockets, P1, P2, P3. The four BOB strain gauges in the first set of strain gauges from each of the three pockets are formed into a first Wheatstone bridge 90 comprised of twelve BOB strain gauges arranged in four legs $L_1$, $L_2$, $L_3$, and $L_4$, with leg $L_1$ being opposite to leg $L_2$ and leg $L_3$ being opposite to leg $L_4$. Each leg, $L_1$, $L_2$, $L_3$, and $L_4$, uses three strain gauges, one from a similar position in each of the pockets. As shown, the BOB strain gauges at the 0° orientation in each of the three pockets are connected in series along leg $L_1$, the BOB strain gauges at the 180° orientation in each of the three pockets are connected in series along leg $L_3$, the BOB strain gauges at the 90° orientation in each of the three pockets are connected in series along leg $L_2$, and the BOB strain gauges at the 270° orientation in each of the three pockets are connected in series along leg $L_4$. The junction formed by legs $L_1$ and $L_3$ forms a first input terminal $I_1$ while the junction formed by legs $L_2$ and $L_4$ forms a second input terminal $I_2$. The junction formed by legs $L_2$ and $L_3$ forms a first output terminal $O_1$, while the junction formed by legs $L_4$ and $L_1$ forms a second output terminal $O_2$.

Figure 7:
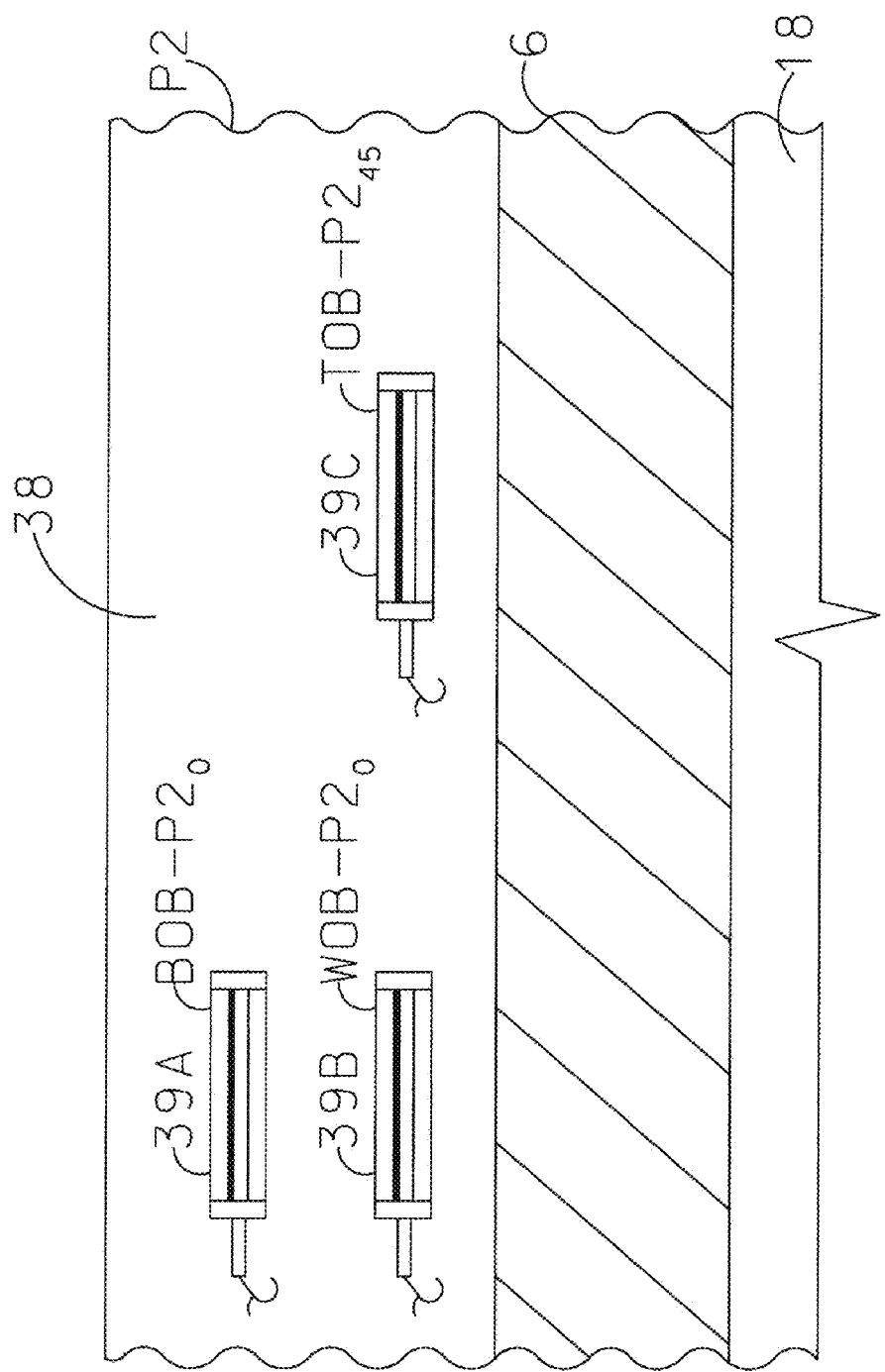
FIG. 7 is a view taken along line VI-VI in FIG. 5A showing a portion of the pocket side wall to which the bending on bit strain gauges are affixed.

It may be desirable to measure the tensile load and torsion load on the drill bit in addition to bending. Thus, WOB and TOB strain gauges may be affixed to the pocket side wall, in addition to the BOB strain gauges. For example, FIG. 7 shows an example portion of a pocket side wall and the arrangement of a BOB strain gauge 39A, a WOB strain gauge 39B, and a TOB strain gauge 39C. The weight on bit (WOB) gauges are positioned in each of the same orientations (i.e., 0, 90, 180, and 270) as the BOB gauges, thus the BOB and WOB strain gauges are shown at the same radial location on the side wall 38. The WOB gauges may be positioned above or below the BOB gauge in the pocket at each of the same orientations, 0, 90, 180, and 270, as long as the WOB strain gauges are positioned longitudinally along the same plane, and the BOB strain gauges are positioned longitudinally along the same plane. In FIG. 7, they are positioned below the BOB gauges.

Figure 8A:
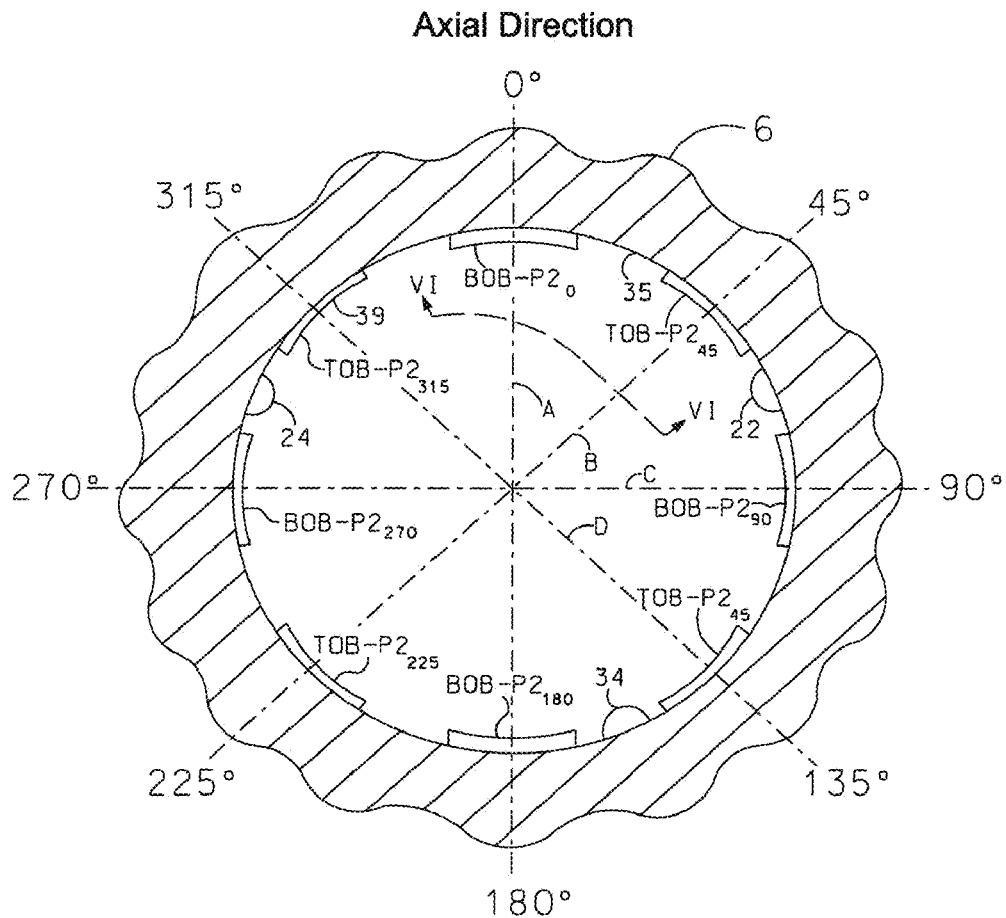
FIG. 8A is an elevation view taken along line IV-IV in FIG. 3 looking into the pocket, with the plug removed, showing the orientation of the weight on bit, torque on bit, and bending on bit strain gauges.
Figure 8B:
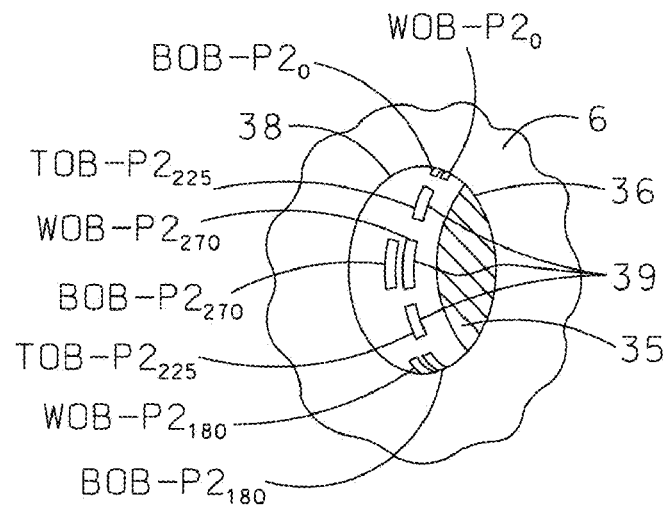
FIG. 8B is an isometric view of the pocket shown in FIG. 8A.

Each strain gauge 39 is oriented so that its sensitive axis is oriented in the circumferential direction with respect to the cylindrical side wall 38. The gauges are mounted in the circular pockets in positions such that the measurements of the individual tensile, torsion, and bending loads can be made. FIGS. 8A and 8B depict an example embodiment of a drill collar with all three types of strain gauges: eight strain (WOB) gauges, 4 torque on bit (TOB) gauges and 4 bending on bit (BOB) gauges 39, equidistantly spaced around the circumference of the pocket side wall 38. With reference to the angle of orientation shown for each of the strain gauges, the four BOB gauges 39 are shown spaced around the circumference of the pocket side wall 38 at angles 0, 90, 180, and 270 orientation. At each location of a BOB gauge, in each of the same orientations, 0, 90, 180, and 270, there may be a weight on bit (WOB) gauge. The WOB gauges may be positioned above or below the BOB gauge in the pocket. In FIG. 8A, they are positioned below the BOB gauges as shown by the isometric view of the pocket in FIG. 8B, hence they are not visible in the cross-section of the drill collar. The isometric view in FIG. 8B more clearly depicts both the BOB and the WOB gauges.

As shown in FIG. 8B, the TOB and WOB gauges are positioned longitudinally in the drill collar on the same plane, and that plane is lower than the plane on which the BOB gauges are positioned. The WOB, BOB, and TOB gauges can be positioned in similar orientations with respect to their sensitive axes. The WOB gauges are positioned in the same orientation as the BOB gauges, in the 0, 90, 180 and 270 orientations, but each WOB gauge is positioned lower (i.e., into the page) in the pocket than the BOB gauges, but on the same plane as the TOB gauges (see FIG. 8B). Because the WOB gauges are positioned on a different plane, directly below each of the BOB gauges, they are not visible in FIG. 8A. However, as shown in the isometric view of pocket P2 in FIG. 8B, the WOB gauges are positioned on the same plane in the pocket as the TOB gauges, on a plane lower than the plane on which the BOB gauges are positioned. In another example embodiment, the BOB gauges can be positioned in the same orientation as the WOB gauges, in the 0, 90, 180 and 270 orientations, but the BOB gauges can be on the same plane as the TOB gauges and the WOB gauges may be on a plane above or below the TOB gauges. It is contemplated that any of the three sets of strain gauges could be positioned on a longitudinal plane that is a different plane from another set.

In FIG. 8A, the strain gauges in each pocket P are electrically connected so as to form three sets of strain gauges, each set comprised of four gauges. The strain gauges 39 in the first set of strain gauges in pocket P2 are identified as BOB-P2$_0$, BOB-P2$_{90}$, BOB-P2$_{180}$, and BOB-P2$_{270}$ and, together with similarly oriented strain gauges in the other two pockets, are used to determine the bending on the drill bit 8. Strain gauges BOB-P2$_0$ and BOB-P2$_{180}$ are disposed on opposite sides of the pocket side wall 38 and are located along a line A that is parallel with the center line E of the drill collar 6 so that BOB-P2$_0$ is located at the 0° circumferential orientation and BOB-P2$_{180}$ is located at the 180° orientation, with 0° being top dead center of the pocket P2. Strain gauges BOB-P2$_{90}$ and BOB-P2$_{270}$ are also disposed on opposite sides of the pocket side wall 38 and located along a line C that is perpendicular to line A, and therefore to the center line E of the drill collar 6, so that BOB-P2$_{90}$ is located at the 90° circumferential orientation and WOB-P2$_{270}$ is located at the 270° orientation.

The second set of strain gauges 39 in pocket P2 are identified as TOB-P2$_{45}$, TOB-P2$_{135}$, TOB-P2$_{225}$, and TOB-P2$_{315}$ and, together with similarly oriented strain gauges in the other two pockets, are used to determine the torque on the drill bit 8. Strain gauges TOB-P2$_{45}$ and TOB-P2$_{225}$ are disposed on opposite sides of the pocket side wall 38 and located along a line B that is oriented 45° to the center line E of the drill collar 6 so that TOB-P2$_{45}$ is located at the 45° circumferential orientation and TOB-P2$_{225}$ is located at the 225° orientation. Strain gauges TOB-P2$_{135}$ and TOB-P2$_{315}$ are also disposed on opposite sides of the pocket side wall 38 and are located along a line D that is perpendicular to line B, and therefore is also oriented at 45° to the center line E of the drill collar 6, so that TOB-P2$_{135}$ is located at the 135° circumferential orientation and TOB-P2$_{315}$ is located at the 315° orientation.

The third set of strain gauges 39 in pocket P2 can be weight on bit gauges, shown in FIG. 5B but not visible in FIG. 8A due to each of 4 WOB, WOB-P2$_0$, WOB-P2$_{90}$, WOB-P2$_{180}$, and WOB-P2$_{270}$ gauges being positioned directly beneath each of the 4 BOB gauges shown. Together with similarly oriented strain gauges in the other two pockets, are used to determine the weight on the drill bit 8. Similar to strain gauges BOB-P2$_0$ and BOB-P2$_{180}$, strain gauges WOB-P2$_0$ and WOB-P2$_{180}$ can be disposed on opposite sides of the pocket side wall 38 along a line A that is parallel with the center line E of the drill collar 6 so that WOB-P2$_0$ is located at the 0° circumferential orientation and WOB-P2$_{180}$ is located at the 180° orientation, with 0° being top dead center of the pocket P2. Also, similar to strain gauges BOB-P2$_{90}$ and BOB-P2$_{270}$, strain gauges WOB-P2$_{90}$ and WOB-P2$_{270}$ can also disposed on opposite sides of the pocket side wall 38 and located along a line C that is perpendicular to line A, and therefore to the center line E of the drill collar 6, so that WOB-P2$_{90}$ is located at the 90° circumferential orientation and WOB-P2$_{270}$ is located at the 270° orientation. The WOB gauges may be positioned below the BOB gauges, as shown in FIG. 8B, or the WOB gauges may be located above the BOB gauges.

As previously discussed, each individual set of strain gauges in pockets P1, P2, and P3 is arranged identically.

With respect to FIGS. 9A-9D, it is assumed that, similar to the embodiment in FIG. 4, the WOB and TOB gauges are positioned on the same plane laterally in the pocket, and each BOB strain gauge is positioned higher than each WOB strain gauge in the same orientation (0, 90, 180, and 270). However, it is noted that the BOB gauges may be placed either above, on top, or below the WOB gauges. The arrangement is represented as W/BOB, indicating that both a WOB and a BOB strain gauge are located at the particular orientation in some radial order, with one type of gauge located above the other type. In FIG. 9($a$), when the portion of the drill collar 6 in the vicinity of a pocket P is subjected to pure axial compression, the strain gauges WOB$_0$ and WOB$_{180}$ are placed in tension, while strain gauges WOB$_{90}$ and WOB$_{270}$ are placed in compression.

In FIG. 9($b$), when the portion of the drill collar 6 in the vicinity of a pocket P is subjected to pure axial tension, the strain gauges W/BOB$_0$ and W/BOB$_{180}$ are placed in compression, while strain gauges W/BOB$_{90}$ and W/BOB$_{270}$ are placed in tension. The WOB and BOB strains at each of the torque gauge locations for the same particular gauge are the same. However, the strain is not zero. The TOB bridge arrangement is designed to cancel out these strains. Strains developed from torque loads are dissimilar and occur in different directions at the torque gauge locations. The TOB bridge is arranged to measure these strains. The axial tension can result in a bending stress and/or strain on the drill bit. The BOB$_0$, BOB$_{180}$, BOB$_{00}$, and BOB$_{270}$ strain gauges measure the bending that results from the bending. The WOB$_0$, WOB$_{180}$ WOB$_{90}$, and WOB$_{270}$ strain gauges measure the strain that results from the axial tension.

FIG. 9($c$) depicts another example of the strain pattern in the hole for tension and torque. The inner line 8 is representative of an un-deflected pocket. The outer line 9 is representative of a stress profile when the hole is under tension, such as that shown in FIG. 9($b$). The gauges located at 0 and 180 degrees sense 3× the nominal strain at this section in the drill collar. For example, if there is a nominal tensile strain, the strain at the location of these gauges is a tensile strain 3× the nominal strain. The strain at 90 and 270 is a compressive stress equal to −⅓× the nominal strain. For example, as shown in FIG. 9($b$), at W/BOB0 and W/BOB180, the strain is three times the nominal strain. At W/BOB90 and W/BOB270, the strain is −⅓× the nominal strain. The WOB, BOB and TOB gauges are connected into an electrical bridge arrangement. This allows the device to measure the desired measurement, while canceling out the effects of the other measurements. For example, when an axial load is applied the bridge arrangement combines the strain measures to calculate this load. The bridge arrangements for the BOB and the TOB cancel out the axial load. As described in more detail with respect to FIG. 10, the arrangement of WOB and BOB gauges, including the electrical connection between the different types of gauge, allow for measuring the weight on bit while canceling out the effect of bending, and for measuring the bending on bit while canceling out the effects of strain.

Figure 9A:
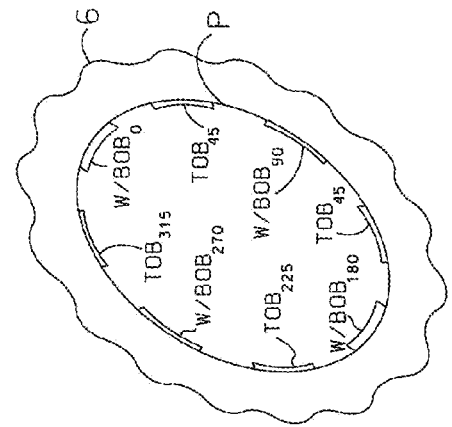
FIGS. 9(a), (c), and (d) show exaggerated views of the distortion of a pocket under compression, tension, and torsion, respectively.
Figure 9B:
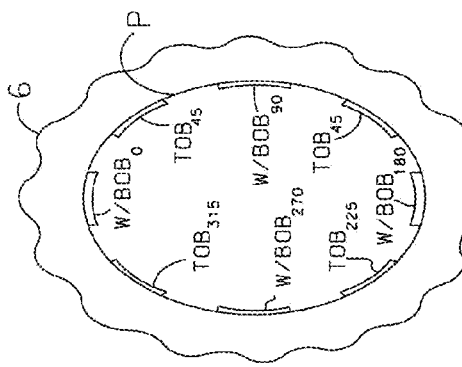
FIG. 9(b) depicts another example of the strain pattern in the hole for tension and torque.
Figure 9C:
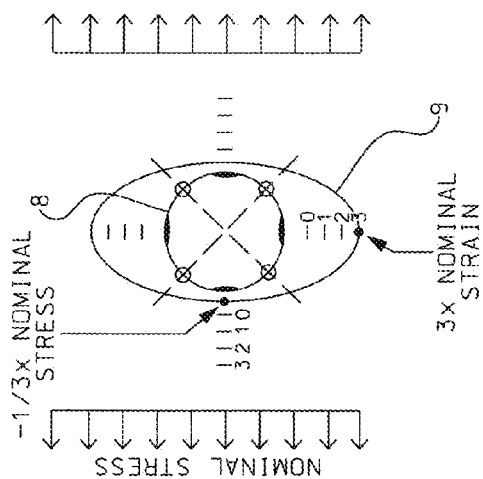
Figure 9D:
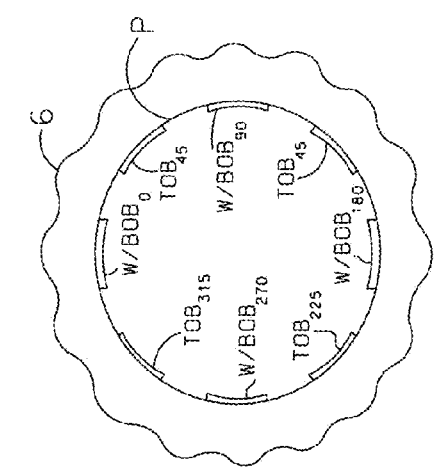

As shown in FIG. 9D, when the portion of the drill collar 6 in the vicinity of a pocket P is subjected to pure torsion, the strain gauges TOB$_{45}$ and TOB$_{225}$ are placed in compression, while strain gauges TOB$_{135}$ and TOB$_{315}$ are placed in tension. The four WOB and the four BOB strain gauges, however, are unaffected. The TOB bridge arrangement, using the TOB gauges as shown in FIG. 9D, is designed to cancel out these strains. Strains developed from torque loads are dissimilar and occur in different directions, D1 and D2, at the torque gauge locations. The TOB bridge is arranged to measure these strains.

Figure 10:
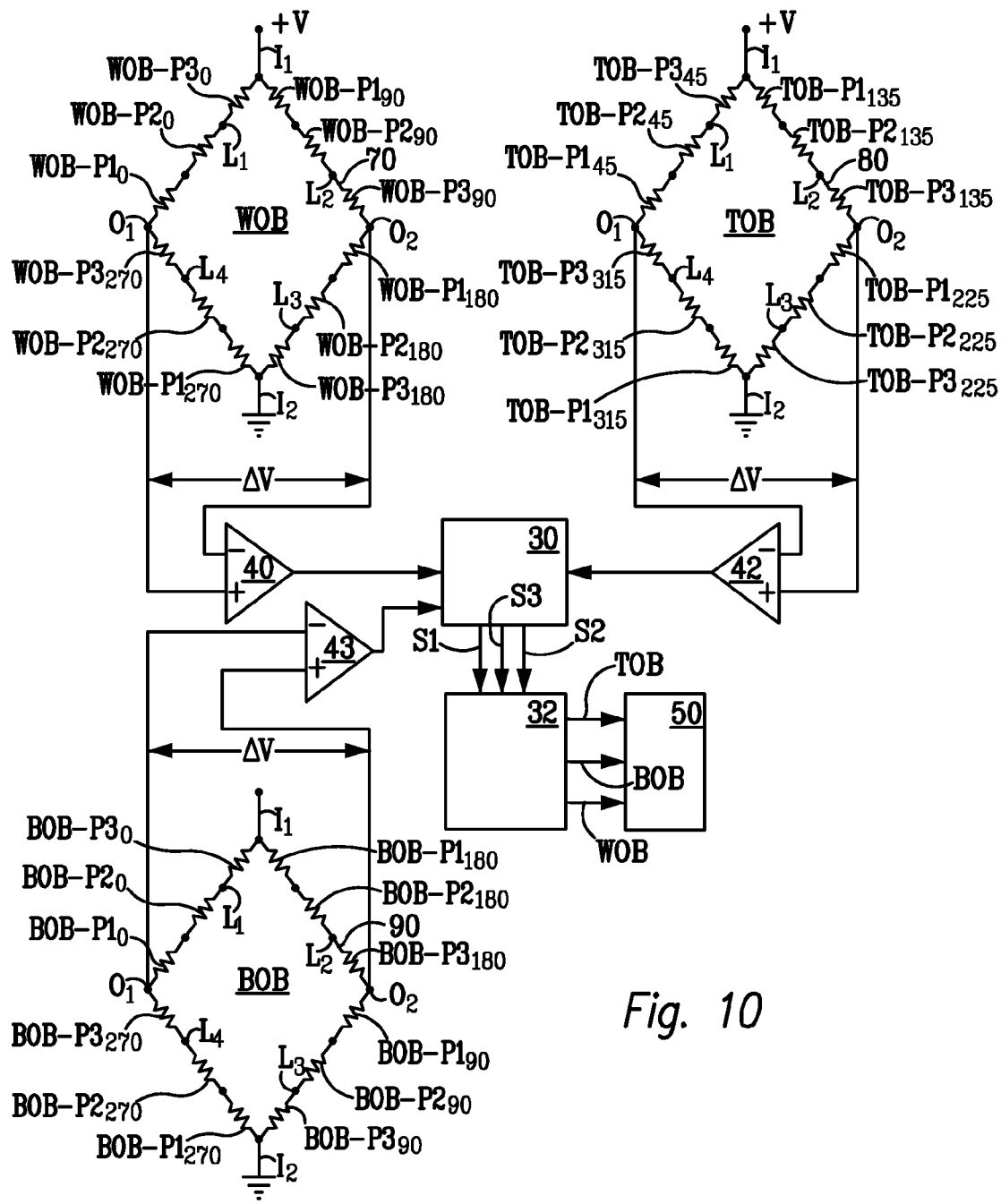
FIG. 10 is a schematic diagram of the system for measuring the tension, torque, and bending on the drill bit according to the current invention.

FIG. 10 depicts a schematic diagram for measuring the weight, bending, and torque on the drill bit, showing three Wheatstone bridges, one each for the WOB gauges 70, the BOB gauges 90, and the TOB gauges 80.

As shown in FIG. 10, the four WOB strain gauges in the first set of strain gauges from each of the three pockets, P1, P2, P3, are formed into a first Wheatstone bridge 70 comprised of twelve WOB strain gauges arranged in four legs $L_1$, $L_2$, $L_3$, and $L_4$, with leg $L_1$ being opposite to leg $L_3$ and leg $L_2$ being opposite to leg $L_4$. For example, leg $L_1$ includes WOB-$P1_0$ (WOB gauge from pocket 1, P1, at the 0° orientation), WOB-$P2_0$ (WOB gauge from pocket 2, P2, at the 0° orientation), and WOB-$P3_0$ (WOB gauge from pocket 3, P3, at the 0° orientation). Each leg, $L_1$, $L_2$, $L_3$, and $L_4$, uses three strain gauges, one from a similar position in each of the pockets. As shown, the WOB strain gauges at the 0° orientation in each of the three pockets are connected in series along leg $L_1$, the WOB strain gauges at the 90° orientation in each of the three pockets are connected in series along leg $L_2$, the WOB strain gauges at the 180° orientation in each of the three pockets are connected in series along leg $L_3$, and the WOB strain gauges at the 270° orientation in each of the three pockets are connected in series along leg $L_4$. The junction formed by legs $L_1$ and $L_2$ forms a first input terminal $I_1$, while the junction formed by legs $L_3$ and $L_4$ forms a second input terminal $I_2$. The junction formed by legs $L_2$ and $L_3$ forms a first output terminal $0_1$, while the junction formed by legs $L_4$ and $L_1$ forms a second output terminal $0_2$.

As also shown in FIG. 10, the four TOB strain gauges in the second set of strain gauges from each of the three pockets are formed into a second Wheatstone bridge 80 comprised of twelve TOB strain gauges arranged in four legs $L_1$, $L_2$, $L_3$, and $L_4$, with leg $L_1$ being opposite to leg $L_3$ and leg $L_2$ being opposite to leg $L_4$. As shown, the TOB strain gauges at the 45° orientation in each of the three pockets are connected in series along leg $L_1$, the TOB strain gauges at the 135° orientation in each of the three pockets are connected in series along leg $L_2$, the TOB strain gauges at the 225° orientation in each of the three pockets are connected in series along leg $L_3$, and the TOB strain gauges at the 315° orientation in each of the three pockets are connected in series along leg $L_4$. The junction formed by legs $L_1$ and $L_2$ forms a first input terminal $I_1$, while the junction formed by legs $L_3$ and $L_4$ forms a second input terminal $I_2$. The junction formed by legs $L_2$ and $L_3$ forms a first output terminal $O_1$, while the junction formed by legs $L_4$ and $L_1$ forms a second output terminal $O_2$.

The BOB Wheatstone bridge 90 is similar to that described above with respect to FIG. 6. The four BOB strain gauges in the first set of strain gauges from each of the three pockets are formed into a first Wheatstone bridge 90 comprised of twelve BOB strain gauges arranged in four legs $L_1$, $L_2$, $L_3$, and $L_4$, with leg $L_1$ being opposite to leg $L_2$ and leg $L$ $L_3$ being opposite to leg $L_4$. As shown, the BOB strain gauges at the 0° orientation in each of the three pockets are connected in series along leg $L_1$, the BOB strain gauges at the 180° orientation in each of the three pockets are connected in series along leg $L_3$, the BOB strain gauges at the 90° orientation in each of the three pockets are connected in series along leg $L_2$, and the BOB strain gauges at the 270° orientation in each of the three pockets are connected in series along leg $L_4$.

As is conventional, in operation, voltages V are applied across the pair of input terminals $I_1$, $I_2$, $I_3$, of each of the bridges 70, 80, and 90. The resistance of the strain gauges in each bridge is such that when the strain gauges are unstrained, the bridge is balanced and the voltage ΔV across the pair of output terminals $O_1$, $O_2$, $O_3$, is zero. However, the resistance of the strain gauges varies proportionately with the strain so that distortion of the portion of the drill collar forming the pocket wall to which the gauges are affixed will result in a voltage drop ΔV across the output terminals.

Importantly, as a result of the arrangement of the strain gauges according to the current invention, variations in the bending load on the drill collar 6 resulting from side forces applied to the drill bit 8 will have no effect on the output voltages V of either the WOB or TOB bridges. For example, as a result of the arrangement of the strain gauges according to the current invention, variations in the weight loads or torsion loads on the drill collar 6 resulting from side forces applied to the drill bit 8 will have no effect on the output voltages V of the WOB, the BOB, or the TOB bridges. This is so because the net effect of strain induced by bending is canceled out within each of the legs of the bridges. Similarly, the weight or torque voltages cancel out such that the net effect of weight and torque are canceled out within each of the legs of the BOB bridge. The differences are noted between the arrangement of legs in the WOB Wheatstone bridge and the legs in the BOB Wheatstone bridge (also shown in FIG. 6). The variation in the electrical connection cancels out the weight on bit measurements such that the bending on bit alone can be evaluated.

With respect to the WOB measurement, the TOB and bending have no effect on the output voltage of the WOB bridge. The general equation for a Wheatstone Bridge is:

$$\Delta E = V \cdot r/(1+r)^2 \cdot (\Delta\Delta R1/R - \Delta R2/R + \Delta R3/R3 - \Delta R4/R4)$$

Assuming a unit measurement of 1 in/in strain in the axial direction and a 0.3 in/in strain in the cross direction, then the WOB bridge factor is as follows:

$$Ng = ((1+1+1)/3 - (-0.3 - 0.3 - 0.3)/3 + (1+1+1)/3 - (-0.3 - 0.3 - 0.3)/3) = 2.6$$

Bending is cancelled due to each arm of the bridge having a net change of resistance of "0." Assuming that the collar is oriented normal to pocket 1 such that pocket 1 has the full bending strain, then the other two pockets located 120 degrees from pocket 1 have half the strain as pocket 1. The strain is also opposite that of pocket 1. Therefore, for bending:

$$Ng = ((1 - 0.5 - 0.5)/3 - (-0.3 + 0.15 + 0.15)/3 + (1 - 0.5 - 0.5)/3 - (0.3 + 0.15 + 0.15)/3) = 0$$

For torque, the strain in each of the WOB gauges is zero and therefore does not influence the measurement.

With respect to the TOB measurement, the TOB uses a Wheatstone bridge that is similar to the WOB bridge. The difference is that the TOB gauges are oriented in such a way that they measure torque induced strains on the collar (as described above). The gauges are mounted 45 degrees from the WOB gauges (FIG. 11), which is the axis of the maximum principle strains for torque in the collar. Torque develops tensile strain on two gauges in each pocket that re opposite to each other, and compressive stress in the other two gauges. The bridge circuit is arranged such that the similar stress gauges are in opposite legs of the bridge. The bridge factor then becomes $$Ng = (1+1+1)/3 - (-1-1-1)/3 - (-1-1-1)/3 + (1+1+1)/3 - (-1-1-1)/3 = 4$$

The WOB strains at the TOB gauges are identical for all gauges. Therefore, the effect of WOB on the TOB bridge is:

$$Ng = (1+1+1)/3 - (1+1+1)/3 + (1+1+1)/3 - (1+1+1)/3 = 0$$

Therefore, WOB strains are self-canceling for the TOB bridge.

Similarly, consider the bending moment tending to bend the top of the drill collar 6, as described above with respect to the BOB bridge, that places pocket P2 in axial compression, as indicated in FIG. 7(a), so that, for example, gauge WOB-P2$_0$ is placed in tension, thereby increasing its resistance. However, pockets P2 and P3 would be placed in axial tension, as indicated in FIG. 7(b), so that gauges WOB-P1$_0$ and WOB-P3$_0$ are each placed in compression, thereby decreasing their resistance. Since the gauges WOB-P1$_0$, WOB-P2$_0$, and WOB-P3$_0$ are connected in series in leg L$_1$ of the WOB bridge, there is no net change in the resistance of this leg. A similar canceling out occurs in the other three legs of the WOB bridge so that the bending strain on the drill collar results in no change in the voltage across the output terminals of the WOB bridge. Since the TOB gauges are located along lines that are oriented at 45° to the centerline of the drill collar 6, the TOB bridge is also unaffected by bending strain.

As described above, with respect to the BOB measurement, the WOB and TOB have no effect on the output voltage of the BOB bridge.

The strain indicated by the WOB, TOB, and BOB bridges 70, 80, and 90 can be determined from the voltage ΔV across their output terminals by the equations:

$\epsilon_{WOB} = [\Delta V/V] \cdot [4/4.2\, K_g]$ $\epsilon_{TOB} = [\Delta V/V] \cdot [4/12\, K_g]$ $\epsilon_{BOB} = [\Delta V/V] \cdot [4/4.2\, K_g]$ where:
$\epsilon_{WOB}$=the strain indicated by the WOB bridge 70
$\epsilon_{TOB}$=the strain indicated by the TOB bridge 80
$\epsilon_{BOB}$=the strain indicated by the BOB bridge 90
V=the voltage applied across the input terminals of the bridge
ÿV=the voltage drop across the output terminals of the bridge
K$_g$=the gauge factor for the strain gauge (from the gauge manufacturer)

The weight, torque, and bending on the drill bit are determined from these strains by the equations:

$WOB = [\epsilon_{WOB} \cdot E \cdot A]/k_t$ $TOB = [\epsilon_{TOB} \cdot J \cdot G]/[R \cdot k_t]$ $BOB = [\epsilon_{TOB} \cdot E \cdot I]/[R \cdot k_t]$ where:
WOB=the weight on the drill bit
TOB=the torque on the drill bit
BOB=the bending on the drill bit
E=the modulus of elasticity for the drill collar material
G=the shear modulus for the drill collar material
A=the cross-sectional area of the drill collar
J=the torsional modulus for the drill collar
R=the radius of the drill collar
k$_t$=the stress concentration factor for the pocket As shown in FIG. 10, the voltage drops ΔV from the WOB, TOB, and BOB bridges 70, 80, and 90 and are amplified by amplifiers 40, 42, and 43, respectively, and then sensed by conventional voltage measuring devices incorporated into the circuit board 30. The output signals S$_1$, S$_2$ and S$_3$ from the voltage measuring devices, which are representative of the strain sensed by the WOB, TOB, and BOB gauges, respectively, are sent to a microprocessor 32, where they are digitized. Using these digitized values, the microprocessor 32 is programmed to perform the computations discussed above so as to arrive at the weight and torque on the drill bit. This information is sent to a mud pulse telemetry system 50 for transmission to the surface using the mud pulser 5, where it is detected by the data acquisition system 12.

Preferably, annulus and bore pressure transducers as well as a temperature sensor are incorporated into the drill collar 6 to permit temperature and pressure compensation. Using techniques well known in the art, the microprocessor uses the pressure measurement to calculate the strain due to pressure and then subtract or add this from the apparent strain to get the true WOB and TOB strains. Similarly, based on a curve supplied by the gauge manufacture, which is also programmed into the microprocessor, temperature correction is also performed for the strain gauges.

Also, although in the preferred embodiment, four strain gauges for each Wheatstone bridge are used, the invention could also be practiced used only two TOB strain gauges provided that they oppose each other—for example, TOB-P2$_{45}$ and TOB-P2$_{225}$ or TOB-P2$_{135}$ and TOB-P2$_{315}$. In this case, precision resistors would be used in the other two legs to balance the bridge.

Figure 11:
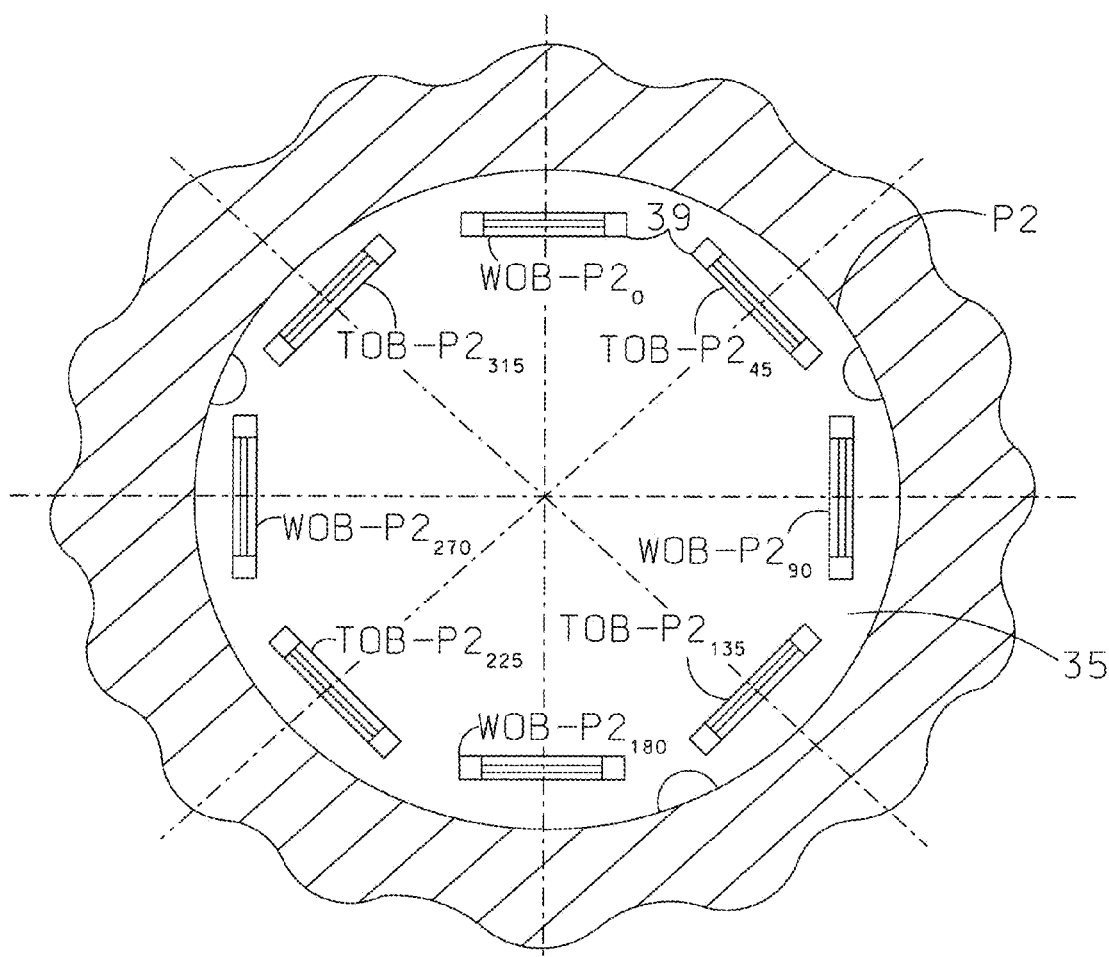
FIG. 11 is a view similar to FIG. 4 showing an alternate embodiment of the disclosed techniques.

Although in the embodiment discussed above, three pockets P are utilized, any greater number of pockets could also be utilized provided that the pockets are circumferentially spaced equidistantly and the strain gauges in each of the pockets are oriented as discussed above and provided that each of the gauges oriented in the same location in each pocket (e.g., each of the 0° gauges) are connected into the same leg of the bridge. Moreover, although in the embodiment discussed above, all of the gauges within each pocket are located in a common plane oriented perpendicularly to the axis of the pocket, the gauges could be located along different planes oriented perpendicularly to the axis of the pocket but displaced from each other along that axis, provided that each pair of opposing gauges (e.g., the 0° and 180° pair of gauges) are located in approximately the same plane. Moreover, although in the embodiment discussed above both the WOB and TOB are located in the same pocket, the WOB gauges could be located in one set of at least three equidistantly spaced pockets and the TOB gauges located in another, independent set of at least three equidistantly spaced pockets. Although in the embodiment discussed above, the pockets are formed into the section of drill pipe forming the drill collar, other sections of the drill string could also be utilized. FIG. 11 shows an alternate embodiment in which the BOB and TOB strain gauges 39 are circumferentially spaced around the bottom wall 35 of each pocket P, and the WOB gauges arranged on the side wall. Alternatively, the BOB gauges could be arranged on the side wall 38 and the WOB and TOB gauges arranged on the bottom wall 35, or the TOB gauges could be arranged on the side wall with either of the BOB or WOB gauges arranged on the bottom wall.

Although in the embodiment discussed above, three pockets P are utilized, any greater number of pockets could also be utilized provided that the pockets are circumferentially spaced equidistantly and the strain gauges in each of the pockets are oriented as discussed above and provided that each of the gauges oriented in the same location in each pocket (e.g., each of the 0° gauges) are connected into the same leg of the bridge. Moreover, although in the embodiment discussed above, all of the gauges within each pocket are located in a common plane oriented perpendicularly to the axis of the pocket, the gauges could be located along different planes oriented perpendicularly to the axis of the pocket but displaced from each other along that axis, provided that each pair of opposing gauges (e.g., the 0° and 180° pair of gauges)

are located in approximately the same plane. Moreover, although in the embodiment discussed above both the WOB and TOB are located in the same pocket, the WOB gauges could be located in one set of at least three equidistantly spaced pockets and the TOB gauges located in another, independent set of at least three equidistantly spaced pockets. Although in the embodiment discussed above, the pockets are formed into the section of drill pipe forming the drill collar, other sections of the drill string could also be utilized.

Figure 12:
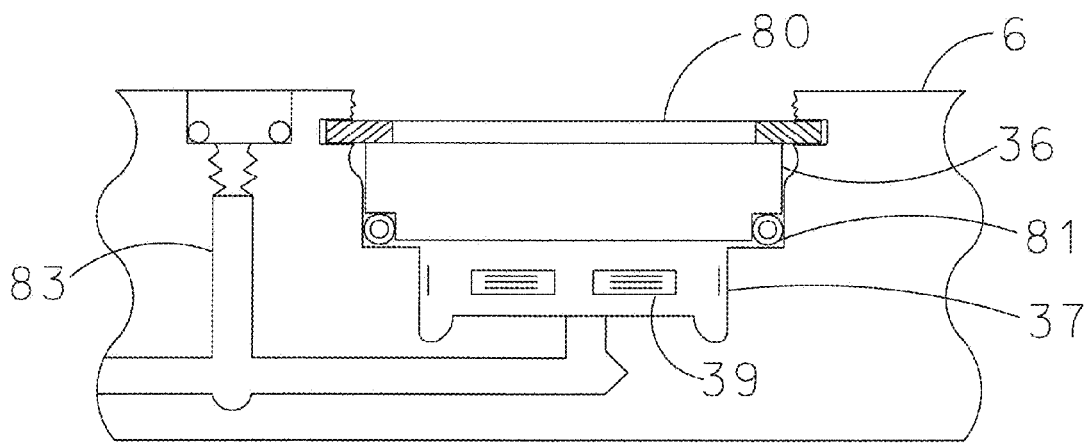
FIG. 12 is a detailed view of one of the pockets shown in FIG. 4.
Figure 13:
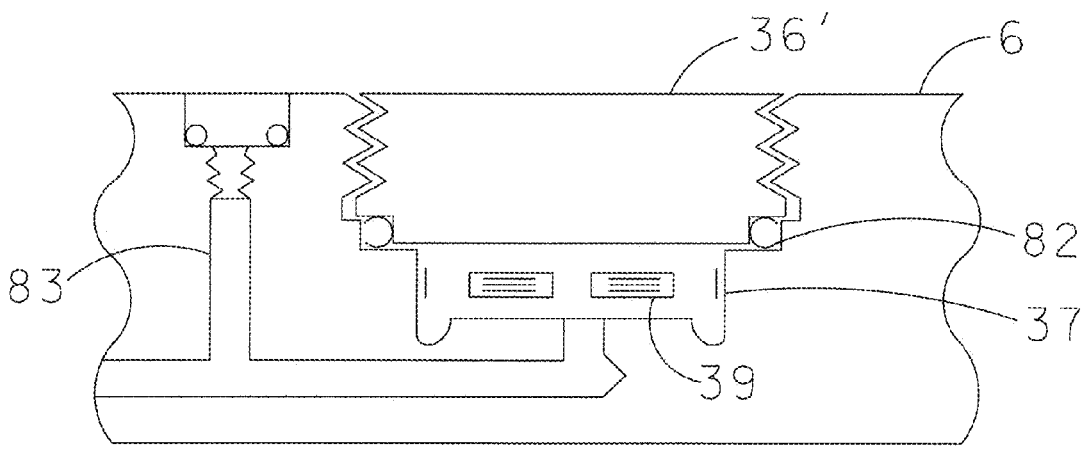
FIG. 13 is an alternate embodiment of the pocket shown in FIG. 12.

As shown in FIG. 12, a passage 83 formed in the drill collar 6 allows the pocket 37 to be purged with an inert gas, such as helium or nitrogen, to prevent degradation of the strain gauges 39. The cap 36 can be secured within the pocket 37 via a snap ring 80, and the pocket sealed from the drilling mud 14 by an 0-ring (not shown), as discussed in the aforementioned U.S. Pat. No. 6,547,016. Alternatively, a metallic seal, such as a C-shaped metallic seal, may be used to prevent drilling mud 14 from entering the pocket. Unlike elastomeric seals, such as 0-rings, metallic seals do not degrade with time and temperature, are not permeable, and do not suffer from explosive decompression when repeatedly exposed to high and low pressures. Suitable metallic seals can be made from Inconel 718, A286, NP35N, 17-7PH or other metals having good corrosion resistance. In the embodiment shown in FIG. 12, a metallic gland seal 81 is used to form a seal between the pocket 37 and the cap 36. In another embodiment, a metallic face seal 82 is used, as shown in FIG. 13. In this embodiment, a threaded cap 36' is used to increase the pre-load applied to the seal 82. In another example embodiment, the inert gas filling port may be incorporated into the cover itself. A seal, such as a metallic seal or an elastomeric o-ring may function as a first seal to prevent drilling fluids from entering the pocket. This seal, acting as a first seal, may also further keep the metallic seal clean and not exposed to the drilling fluid at least for a period of time.

Accordingly, it should be realized that the present invention may be embodied in other specific forms without departing from the spirit or essential attributes thereof and that reference should be made to the appended claims, rather than to the foregoing specification, as indicating the scope of the invention.

What is claimed:

1. A method for sensing the bending applied to a drill bit coupled to a drill string operating down hole in a well, comprising the steps of:
  a) rotating said drill string, said drill string having a plurality of pockets formed therein in each of which is located a set of strain sensors connected by circuitry so as to form a bridge, wherein each of said sets of strain sensors is affixed to a wall of its respective pocket, each of said sets of strain sensors comprising first, second, third and fourth strain sensors circumferentially spaced approximately equidistantly around said wall of its respective pocket, and wherein:
    each of said first strain sensors in each of said sets of strain sensors are disposed opposite said third strain sensor in its respective set, whereby said first and third strain sensors in each of said pockets form a first opposing pair of strain sensors;
    each of said second strain sensors in each of said sets of strain sensors are disposed opposite said fourth strain sensor in its respective set, whereby said second and fourth strain sensors in each of said pockets form a second opposing pair of strain sensors; and
    said first and third strain sensors in said first opposing pair are disposed along a line parallel to said centerline of said drill pipe, said second and fourth strain sensors in said second opposing pair are disposed along a line perpendicular to said centerline of said drill pipe;
  b) applying a voltage across one of first and second pairs of terminals formed by circuitry connecting each of said strain sensors in said sets, said circuitry forming a bridge, said bridge comprising first, second, third and fourth legs, and wherein:
    said first leg of said bridge being opposite to said second leg of said bridge and adjoining said third leg of said bridge, wherein a first junction is formed between said first and third legs;
    said fourth leg of said bridge being opposite said third leg of said bridge and adjoining said second leg, wherein a second junction is formed between second and fourth legs, a third junction is formed between said second and third legs, and a fourth junction is formed between said first and fourth legs;
    each of said first strain sensors in each of said pockets connected in series along said first leg of said bridge;
    each of said third strain sensors in each of said pockets connected in series along said third leg of said bridge, wherein said opposing strain sensors in each of said first opposing pair of strain sensors are connected along adjoining legs of said bridge;
    each of said fourth strain sensors in each of said pockets connected in series along said second leg of said bridge;
    each of said second strain sensors in each of said pockets connected in series along said fourth leg of said bridge;
    wherein each of said legs of said bridge has connected therealong one of said strain sensors from each of said first, second and third pockets, and wherein said opposing strain sensors in each of said second opposing pair of strain sensors are connected along adjoining legs of said bridge;
    wherein said first and second junctions form said first pair of terminals, and
  wherein said third and fourth junctions form said second pair of terminals;
  c) sensing a voltage across the other of said first and second pairs of terminals;
  d) determining said bending on said drill bit from said sensed voltage.

* * * * *

UNITED STATES PATENT AND TRADEMARK OFFICE
CERTIFICATE OF CORRECTION

PATENT NO. : 8,397,562 B2
APPLICATION NO. : 12/512740
DATED : March 19, 2013
INVENTOR(S) : Mark Ellsworth Wassell, Martin E. Cobern and Carl Allison Perry Page 1 of 1

It is certified that error appears in the above-identified patent and that said Letters Patent is hereby corrected as shown below:

In the specification

Col. 3, line 53, delete "derrick 9", insert --derrick 5--;

Col. 9, line 56, delete "L $L_3$", insert --$L_3$--;

Col. 10, line 46, delete "$Ng=((1-0.5-0.5)/3-(-0.3+0.15+0.15)/3+(1-0.5-0.5)/3-(0.3+0.15+0.15)/3)=0$", insert --$Ng=((1-0.5-0.5)/3-(-0.3+0.15+0.15)/3+(1-0.5-0.5)/3-(-0.3+0.15+0.15)/3)=0$--;

Col. 10, line 62, delete "$Ng=(1+1+1)/3-(-1-1-1)/3-(-1-1-1)/3+(1+1+1)/3-(-1-1-1)/3=4$", insert --$Ng=(1+1+1)/3-(-1-1-1)/3+(1+1+1)/3-(-1-1-1)/3=4$--.

Signed and Sealed this
Twenty-eighth Day of June, 2016

Michelle K. Lee
*Director of the United States Patent and Trademark Office*